United States Patent
Sanchez (10) Patent No.: US 7,315,436 B1
(45) Date of Patent: Jan. 1, 2008

(54) SUSPENSION ASSEMBLY WITH A SHAPE MEMORY ACTUATOR COUPLED TO A GIMBAL

(75) Inventor: Steve Estrada Sanchez, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 441 days.

(21) Appl. No.: 10/877,916

(22) Filed: Jun. 25, 2004

(51) Int. Cl.
*G11B 5/56* (2006.01)

(52) U.S. Cl. .................................... 360/294

(58) Field of Classification Search ............... None
See application file for complete search history.

(56) References Cited

U.S. PATENT DOCUMENTS

| | | | |
|---|---|---|---|
| 5,023,737 A * | 6/1991 | Yaeger | 360/254.5 |
| 5,377,058 A | 12/1994 | Good et al. | |
| 5,463,514 A * | 10/1995 | Yaeger | 360/254.3 |
| 6,105,421 A | 8/2000 | Yao et al. | |
| 6,272,909 B1 | 8/2001 | Yao et al. | |
| 6,501,625 B1 | 12/2002 | Boismier et al. | |
| 6,522,050 B2 | 2/2003 | Sivadasan et al. | |
| 6,577,466 B2 | 6/2003 | Meyer et al. | |
| 6,611,399 B1 | 8/2003 | Mei et al. | |
| 6,614,625 B1 * | 9/2003 | Kuwajima et al. | 360/254.7 |
| 6,707,646 B2 | 3/2004 | Berger et al. | |
| 6,717,776 B2 | 4/2004 | Boutaghou | |
| 6,765,765 B2 * | 7/2004 | Bement et al. | 360/294.3 |
| 6,954,339 B2 * | 10/2005 | Bement et al. | 360/294.7 |
| 2002/0114108 A1 * | 8/2002 | Bement et al. | 360/245.4 |
| 2003/0151854 A1 | 8/2003 | Lee | |

FOREIGN PATENT DOCUMENTS

EP     0 605 343 A1     7/1994

OTHER PUBLICATIONS

Potapov, Pavel L. Time Response of Nitinol Ribbons [online], [retrieved Sep. 7, 2004]. Retrieved from the Internet <URL: http://emat.ruca.ua.ac.be/pdf/c-Timer-A.pdf>.

Song, H., et al. Simulation of Flow Field and Particle Trajectories in Hard Disk Drive Enclosures [online], [retrieved Sep. 7, 2004]. Retrieved from the Internet <URL: https://dspace.mit.edu/bitstream/1721.1/3895/2/HPCES018.pdf>.

Tolomeo, Deborah, et al. Cyclic Properits of Superelastic Nitinol: Design Implications [online], [retrieved Sep. 7, 2004]. Retrieved from the Internet <URL: http://www.engineeringreference.com/H-Processes/NitinolDesign.pdf>.

* cited by examiner

*Primary Examiner*—A. J. Heinz
*Assistant Examiner*—Mark Blouin
(74) *Attorney, Agent, or Firm*—Stetina, Brunda, Garred & Brucker (57) ABSTRACT

A suspension assembly for use with a disk drive having a disk and a slider. The suspension assembly includes a gimbal for receiving the slider. The suspension assembly further includes a shape memory actuator coupled to the gimbal. The shape memory actuator is formed of a shape memory metal material configured to deform in response to a dc input for selectively moving the slider towards and away from the disk.

21 Claims, 9 Drawing Sheets

SUSPENSION ASSEMBLY WITH A SHAPE MEMORY ACTUATOR COUPLED TO A GIMBAL

BACKGROUND OF THE INVENTION

1. Field of the Invention

The present invention relates generally to disk drives, and in particular to a disk drive suspension assembly including a shape memory actuator coupled to a gimbal.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The spindle motor includes a spindle motor hub that is rotatably attached to the disk drive base. The hub has an outer hub flange that supports a lowermost one of the disks. Additional disks may be stacked and separated with annular disk spacers that are disposed about the hub.

The head stack assembly has an actuator assembly having at least one transducer head (typically a magneto-resistive or "MR" head), typically several, for reading and writing data from and to the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

In further detail, the head stack assembly includes an actuator assembly, at least one head gimbal assembly, and a flex circuit cable assembly. A conventional "rotary" or "swing-type" actuator assembly typically includes an actuator having an actuator body. The actuator body is configured to rotate on a pivot assembly between limited positions about an axis of rotation. A coil support extends from one side of the actuator body. A coil is supported by the coil support and is configured to interact with one or more permanent magnets to form a voice coil motor. One or more actuator arms extend from an opposite side of the actuator body. To facilitate rotational movement of the actuator, the actuator assembly further includes the actuator body that has a bore and a pivot bearing cartridge engaged within the bore. Each magnetic disk includes opposing disk surfaces. Data may be recorded on a single surface or both along data annular regions. As such, the head stack assembly may be pivoted such that each transducer head is disposed adjacent the various data annular regions from adjacent the outer diameter to the inner diameter of each disk.

Conductive traces (formed of copper for example) are laid on a dielectric layer (such as a polyimide film) formed on the head gimbal assembly. The dielectric layer electrically insulates the conductive traces from the gimbal (which may be formed of stainless steel for example). Such technologies are variously named TSA (Trace Suspension Assembly), NSL (No Service Loop), FOS (Flex On Suspension) and the like. These conductive traces interconnect the elements of the transducer head to drive a preamp and the circuits associated therewith.

A typical suspension assembly includes a load beam (also referred to as a "suspension") and a base plate (also referred to as a "nut plate" or "swage plate"). The base plate is used to attach the load beam to the end of the actuator arms, typically through a swage engagement. The suspension assembly further includes the gimbal supported at the end of the load beam. A hinge plate may also be utilized which is interposed between the load beam and the base plate. The suspension assembly with the slider attached to the gimbal is typically referred to as a head gimbal assembly.

The transducer head is disposed within the slider. The load beam has a spring function that provides a "gram load" biasing force and a hinge function that permits the head to follow the surface contour of the spinning disk. The load beam has an actuator end that connects to the actuator arm and a gimbal end that connects to the gimbal that carries the slider and transmits the gram load biasing force to the slider to "load" the slider against the disk. A rapidly spinning disk develops a laminar airflow above its surface that lifts the slider including the head away from the disk in opposition to the gram load biasing force. The slider is said to be "flying" over the disk when in this state.

As disk drives have progressed to higher areal densities, the fly height and the fly height tolerances has been correspondingly reduced. As such, the ability to maintain the slider within such operational specifications has become increasingly difficult. Accordingly, there is a need in the art for a disk drive having an improved suspension assembly design in comparison to the prior art.

SUMMARY OF THE INVENTION

An aspect of the present invention can be regarded as a suspension assembly for use with a disk drive having a disk and a slider. The suspension assembly includes a gimbal for receiving the slider. The suspension assembly further includes a shape memory actuator coupled to the gimbal. The shape memory actuator is formed of a shape memory metal material configured to deform in response to a dc input for selectively moving the slider towards and away from the disk.

According to various embodiments, the shape memory actuator may be integrated with the gimbal. The suspension assembly may further include a load beam. The gimbal is coupled to the load beam and the shape memory actuator is coupled to the load beam. Deflection of the shape memory actuator moves the load beam and the gimbal for selectively moving the slider towards and away from the disk. The shape memory actuator may be integrated with the load beam. The load beam may generally define a load beam longitudinal axis, and the shape memory actuator may be generally elongate and generally aligned with the load beam longitudinal axis. The load beam may include a load beam main section and a load beam distal end. The gimbal may be supported by the load beam main section. The shape memory actuator is coupled to the load beam distal end, and the load beam distal end is formed to engage the gimbal upon actuation of the shape memory actuator. The gimbal is cooperatively formed with the load beam distal end to rotate with respect to the load beam main section upon engagement with the load beam distal end for pitch control of the slider.

In another embodiment, the suspension assembly includes a load beam and a hinge plate. The gimbal is coupled to the load beam, and the shape memory actuator is coupled to the hinge plate. Deflection of the shape memory actuator moves the hinge plate, the load beam and the gimbal for selectively moving the slider towards and away from the disk. The shape memory actuator may be integrated with the hinge plate.

The gimbal generally may define a gimbal longitudinal axis, and the shape memory actuator may be generally elongate and generally aligned with the gimbal longitudinal axis. The shape memory metal material may be formed of a NiTiNol material, a CuZnAl material, or a CuAlNi material, for examples.

According to another aspect of the present invention, there is provided a head stack assembly for use with a disk drive having a disk and a slider. The head stack assembly includes, an actuator arm, a gimbal coupled to the actuator arm, a slider supported by the gimbal, and a shape memory actuator coupled to the gimbal. The shape memory actuator is as described above. According to yet another aspect of the present invention, there is provided a disk drive including a disk drive base, a disk rotatably coupled to the disk drive base, and a head stack assembly rotatably coupled to the disk drive base. The head stack assembly is as described above.

DESCRIPTION OF THE PREFERRED EMBODIMENTS

Referring now to the drawings wherein the showings are for purposes of illustrating preferred embodiments of the present invention only, and not for purposes of limiting the same, FIGS. 1-17 illustrate a disk drive and suspension assemblies in accordance with the aspects of the present invention.

Figure 1:
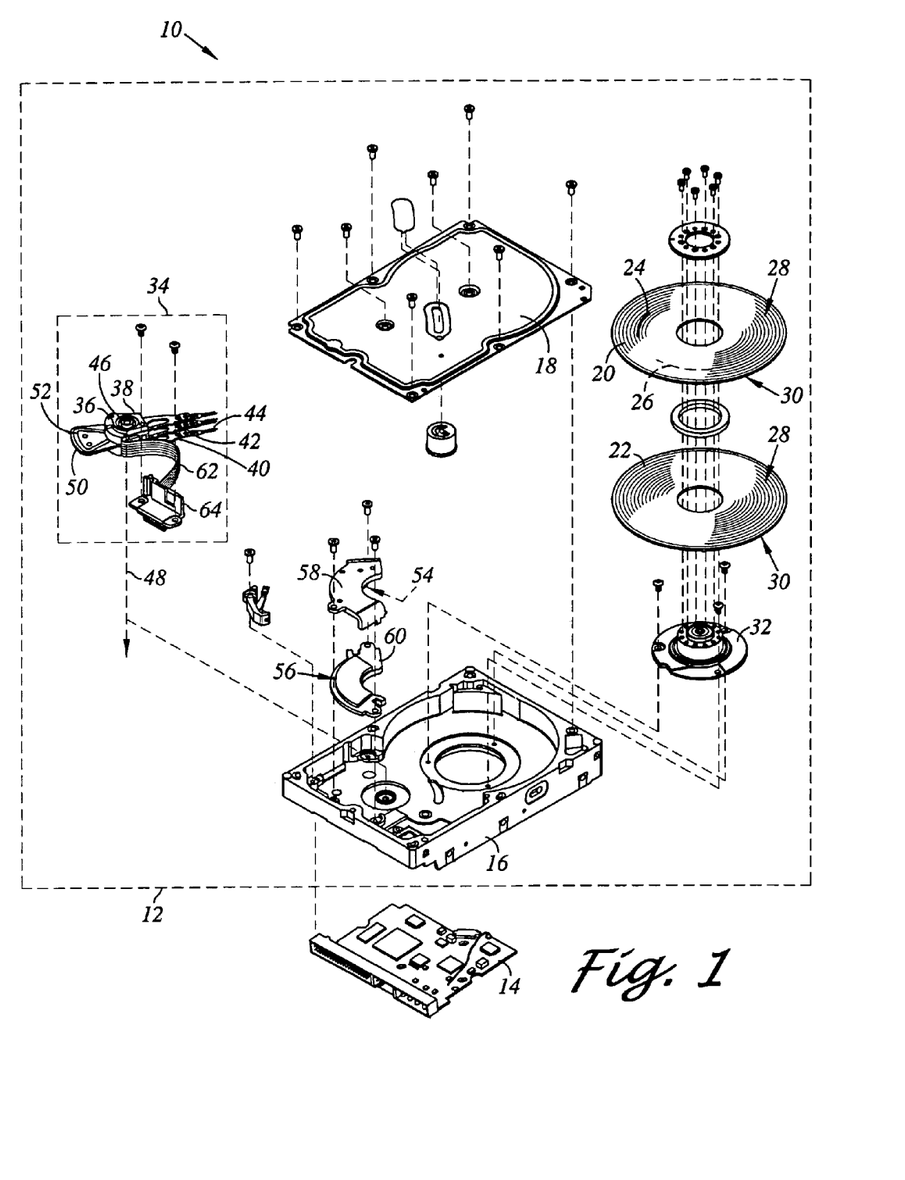
FIG. 1 is an exploded perspective view of a disk drive in accordance with the present invention.

Referring now to FIG. 1, there is depicted an exploded perspective view of a disk drive 10 as constructed in accordance with an aspect of the present invention. The disk drive 10 includes a head disk assembly (HDA) 12 and a printed circuit board assembly (PCBA) 14. The head disk assembly 12 includes a disk drive housing with a disk drive base 16 and a cover 18.

Referring now to FIG. 1 there is depicted an exploded perspective view of a disk drive 10 constructed in accordance with an aspect of the present invention. In the embodiment shown, the disk drive 10 includes a head disk assembly (HDA) 12 and a printed circuit board assembly (PCBA) 14. The head disk assembly 12 includes a housing which may include a disk drive base 16 and a cover 18 that collectively house magnetic disks 20, 22. Each magnetic disk 20, 22 contains a plurality of tracks for storing data. The disks 20, 22 may be two-sided, and thus for example, the magnetic disk 20 is shown having a track 24 on an upper disk surface 28 and a track 26 (shown in phantom) on a lower disk surface 30.

The head disk assembly 12 further includes a spindle motor 32 for rotating the disks 20, 22. The head disk assembly 12 further includes a head stack assembly 34 rotatably attached to the disk drive base 16 in operable communication with the disks 20, 22. The head stack assembly 34 includes a rotary actuator 36. In the embodiment shown, the actuator 36 includes an actuator body 38 and actuator arms (the lowermost one denoted 40) that extend from the actuator body 38. Distally attached to each of the actuator arms 40 is a suspension assembly (the lowermost one denoted 42). Each suspension assembly 42 respectively supports a slider (the lowermost one denoted 44). Each of the slider 44 includes a transducer head. The suspension assemblies 42 with the sliders 44 are referred to as head gimbal assemblies. It is contemplated that the number of actuator arms and suspension assemblies may vary depending upon the number of disks and disk surfaces utilized.

The actuator body 38 includes a bore, and the actuator 36 further includes a pivot bearing cartridge 46 engaged within the bore for facilitating the actuator body 38 to rotate between limited positions about an axis of rotation 48. The actuator 36 further includes a coil support 50 that extends from one side of the actuator body 38 opposite the actuator arms 40. In this embodiment, the coil support 50 is configured to support a coil 52. A pair of magnetic elements 54, 56 is supported by mounts 58, 60 which are attached to the disk drive base 16 (magnetic element 54 is indicated by the dashed lead line and it is understood the magnetic element 54 is disposed underneath the mount 58). The coil 52 interacts with the magnetic elements 54, 56 to form a voice coil motor for controllably rotating the actuator 36.

The head stack assembly 34 further includes a flex circuit assembly 62 and a cable connector 64. The cable connector 64 is attached to the disk drive base 16 and is disposed in electrical communication with the printed circuit board 14. The flex circuit assembly 62 supplies current to the actuator coil 52 and carries signals between the transducer heads of the sliders 44 and the printed circuit board assembly 14.

Figures 2, 3:
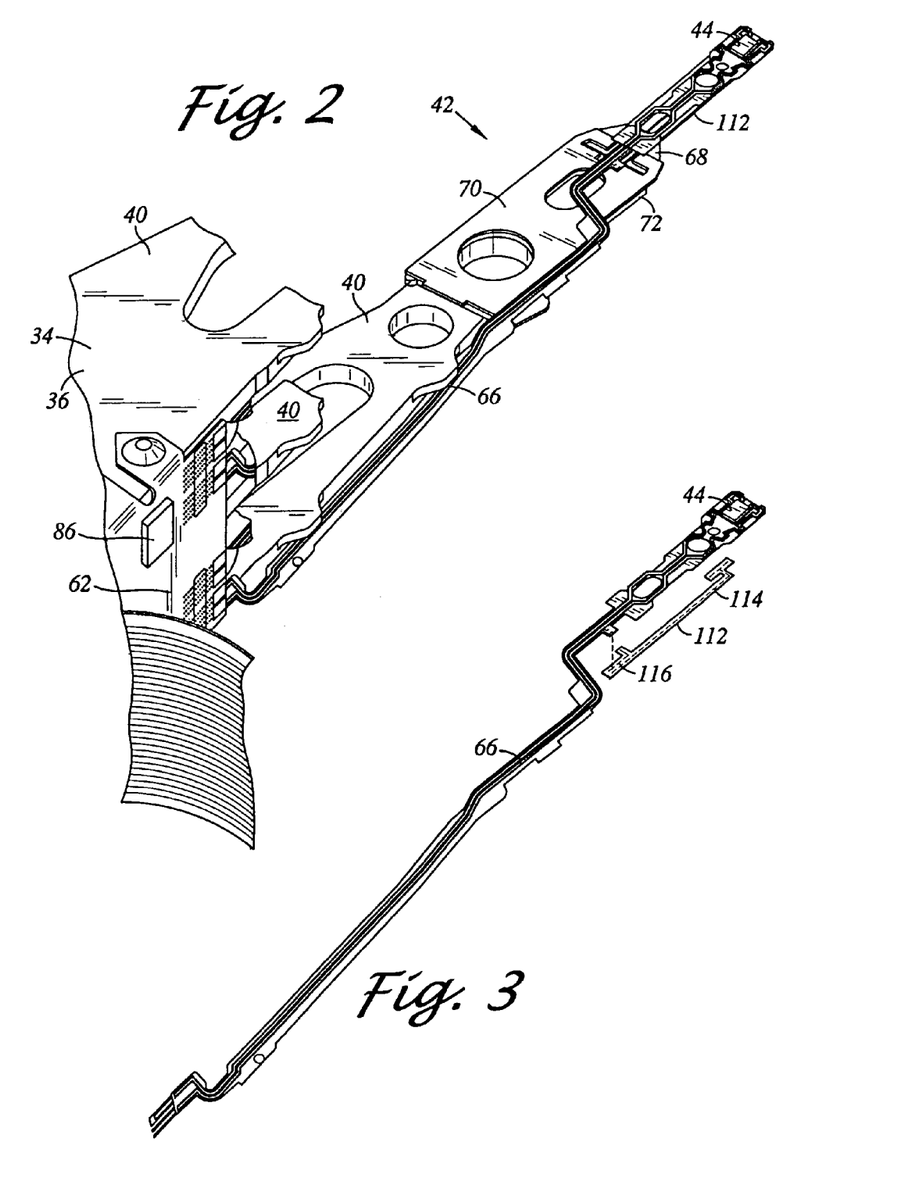
FIG. 2 is an enlarged perspective view of a portion of a head stack assembly and an actuator arm with a suspension assembly with a slider of FIG. 1 in accordance with an aspect of the present invention.
FIG. 3 is a perspective view of a trace suspension assembly with a slider of the suspension assembly of FIG. 2 as shown with a jump trace exploded away from a remainder of the trace suspension assembly.

FIG. 2 is an enlarged perspective view of a portion of a head stack assembly 34 of the disk drive 10 of FIG. 1 including the suspension assembly 42 with the slider 44. Only portions of the two uppermost actuator arms 40 are shown so as to reveal the lowermost actuator arm 40. FIG.

Figure 4:
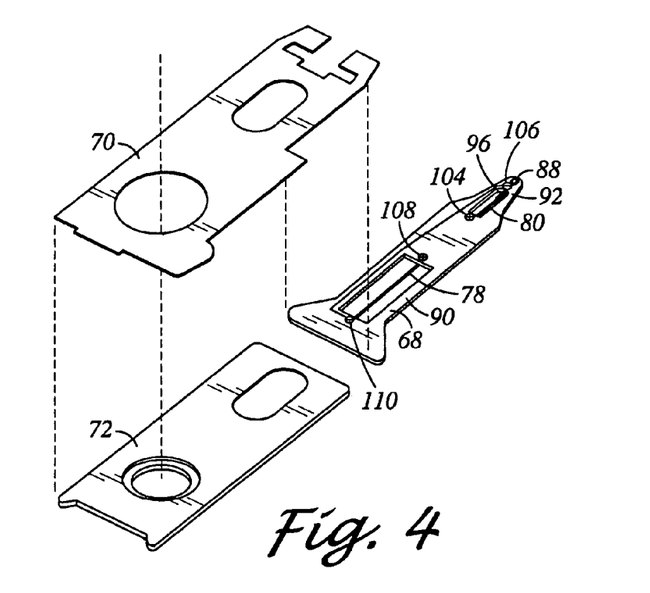
FIG. 4 is an exploded enlarged perspective view of a base plate, a hinge plate, and a load beam of the suspension assembly of FIG. 2.
Figure 5:
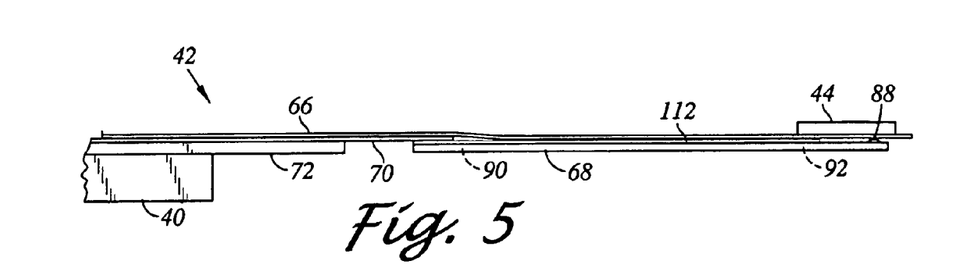
FIG. 5 is an enlarged side view of the suspension assembly of FIG. 2.

3 is a perspective view of a trace suspension assembly 66 of the suspension assembly 42 of the head stack assembly 34 of FIG. 2 as shown with the slider 44. A jump trace 112 is shown exploded away from a remainder of the trace suspension assembly 66. FIG. 4 is an enlarged exploded view of a load beam 68, a hinge plate 70, and a base plate 72 of the suspension assembly 42 of FIG. 2. FIG. 5 is an enlarged side view of the suspension assembly 42 of FIG. 2 including the load beam 68, the hinge plate 70, and the base plate 72, the slider 44 and a portion of the trace suspension assembly 66. The hinge plate 70 may be used to couple the load beam 68 to the base plate 72. The base plate 72 may include a swage opening that is utilized to attach the base plate 72 and hinge plate 70 to the actuator arm 40 via a swaging operation. Thus, the load beam 68 may be coupled to the actuator arm 40.

Figure 6:
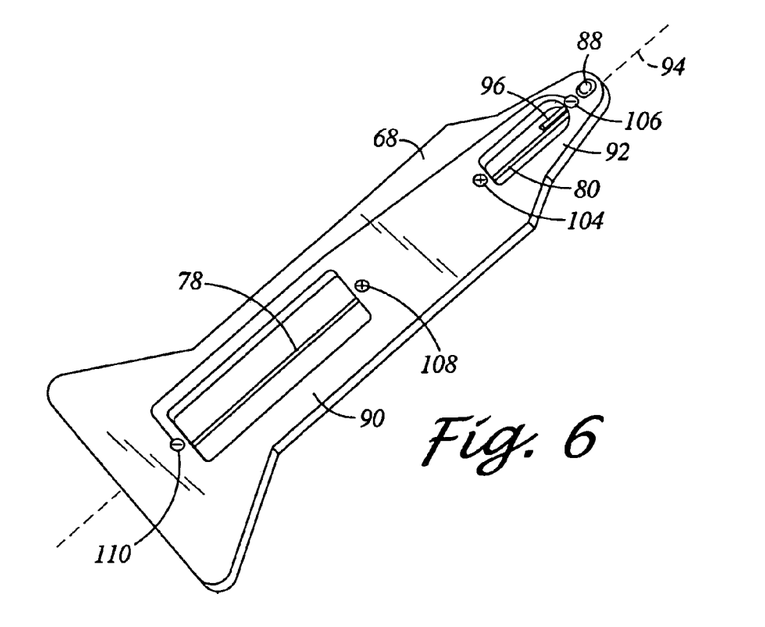
FIG. 6 is an enlarged top perspective view of the load beam of FIG. 4 including shape memory actuators.
Figure 7:
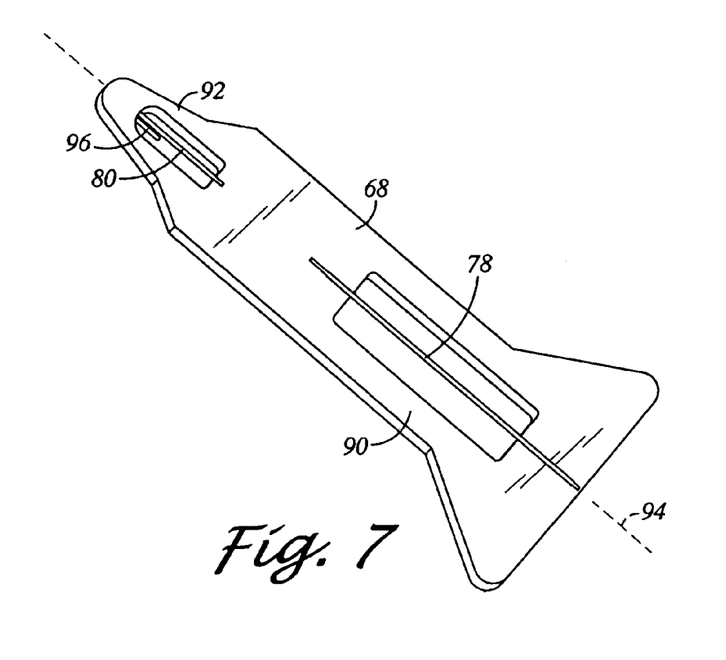
FIG. 7 is an enlarged bottom perspective view of the load beam of FIG. 6.
Figure 8:
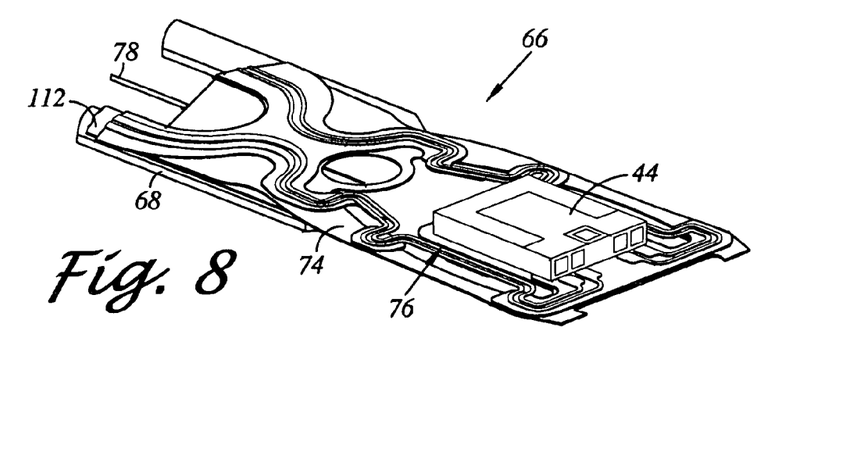
FIG. 8 is an enlarged perspective view of portions of the load beam, the trace suspension assembly, and the slider of FIG. 2.

As shown in FIGS. 6 and 7 there is respectively depicted enlarged top and bottom perspective views of the load beam 68. As will be discussed in detail below, the load beam 68 includes shape memory actuators 78, 80 according to an aspect of the present invention. FIG. 8 is an enlarged perspective view of a portion of the trace suspension assembly 66, a portion of the load beam 68, and the slider 44 (shown in phantom lines) of FIG. 3 as seen from another viewing angle. FIG. 7 is an enlarged view of the portion of the trace suspension assembly 66 of FIG. 6 with the load beam 68 and the slider 44 seen exploded from the trace suspension assembly 66. The trace suspension assembly 66 includes a trace suspension assembly backing layer 74 which includes a gimbal 76. The gimbal 76 is configured to support the slider 44. Conductive traces 82 (formed of copper for example) are laid on a dielectric layer 84 (such as a polyimide film) formed on the trace suspension assembly backing layer 74. The dielectric layer 84 electrically insulates the conductive traces 82. The conductive traces 82 are used to electrically connect the slider 44 to the flex circuit assembly 62. The flex circuit assembly 62 may include a preamp 86. The preamp 86 may be utilized to amplify electronic signals from the transducer head of the slider 44 and pass such amplified electronic signals to the printed circuit board assembly 14.

An aspect of the present invention can be regarded as the suspension assembly 42 for use with the disk drive 10 having the disk, such as disk 20, and the slider 44. The suspension assembly 42 includes the gimbal 76 for receiving the slider 44. The suspension assembly 42 further includes a shape memory actuator, such as the shape memory actuator 78, coupled to the gimbal 76. The shape memory actuator 78 is formed of a shape memory metal material configured to deform in response to a dc input for selectively moving the slider 44 towards and away from the disk 20.

As mentioned above the shape memory actuator, such as either of the shape memory actuators 78, 80, is formed of a shape memory metal material. The shape memory metal material may be formed of a NiTiNol material, a CuZnAl material, or a CuAlNi material, for examples. In this regard, such materials include any of their respective alloys. Further, the shape memory metal material may further include use of carbon tube technology. The shape memory metal material is particularly characterized as exhibiting a deformation in response to the application of a dc input. Such dc input may be a dc current or voltage. Once a dc input is applied it is contemplated that the shape memory metal material is able to substantially maintain a deformed shape even after the application of the dc input is discontinued. Additionally, it is contemplated that the flex circuit assembly 62 may typically include a dc input source as required by the preamp 86. Thus, the dc input is readily available at the flex circuit assembly 62.

Figure 9:
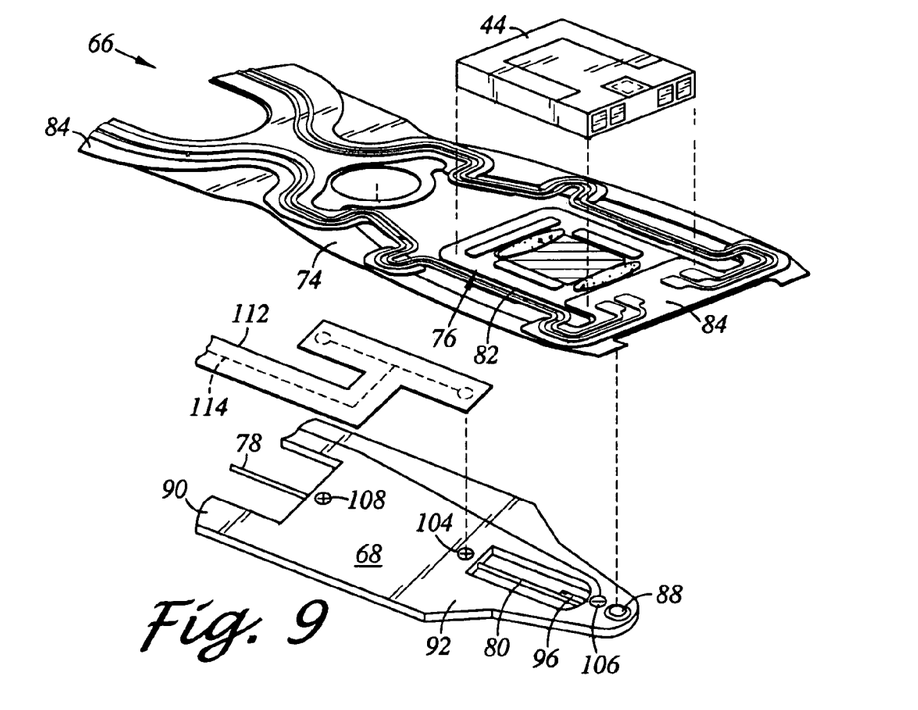
FIG. 9 is an exploded view of the portions of the load beam, the trace suspension assembly, and the slider of FIG. 8.

The trace suspension assembly 66 may include the jump trace 112. It is understood that the jump trace 112 is positioned in direct contact with the load beam 68 between the remainder of the trace suspension assembly 66 and the load beam 68. The jump trace 112 includes electrical traces 114, 116 that electrically connect to the shape memory actuators 78, 80 with the flex circuit assembly 62 to provide the required dc input. As shown in FIGS. 3 and 9, in this view it is understood that the electrical traces 114, 116 are on a bottom side of the jump trace 112 and are indicated in dashed lines. As shown in FIG. 6, the shape memory actuator 78 includes a positive pad 108 and a negative pad 110, and the shape memory actuator 80 includes a positive pad 104 and a negative pad 106. The electrical trace 114 may be disposed in contact with the positive pads 104, 108, and the electrical trace 116 may be disposed in contact with the negative pads 106, 110. While the electrical trace 114 is shown to electrically connect both of the positive pads 104, 108, it is contemplated that separate electrical connections may be utilized for independent operation of the shape memory actuators 78, 80.

It is contemplated that the shape memory material does not include any of those materials which are of a class of piezo electric materials. It is contemplated that piezo electric materials may also exhibit a characteristic of deforming in response to an electric input. However, piezo electric materials require a constant application of an electric input in order to maintain a desired deformation. Thus use of piezo electric materials in the context of any actuation of any of the suspension assembly components would require a constant source of an ac input. It is contemplated that common flex circuit designs do not have an ac input source readily available. Such piezo electric materials require a relatively higher voltage in order to achieve a comparable deformation in comparison to shape memory metal materials. For example, a piezo electric material may require 18-36 volts of an ac input which is specially required to be drawn from the printed circuit board assembly 14. In contrast, use of a shape memory metal material for the shape memory actuators 78, 80 may only require 0.3 volts at 0.035 amps of a dc input drawn locally from the flex circuit assembly 62 for example.

Moreover, piezo electric materials are typically nonmetallic in nature. Being a metal, the utilization of a shape memory metal material may provide a desired degree of damping as well as mass so as to modify of the associated natural frequency response curve in comparison to a non-metallic piezo electric material.

In the embodiment shown as mentioned above suspension assembly 42 includes the load beam 68. The shape memory actuators 78, 80 are integrated with the load beam 68. The gimbal 76 is coupled to the load beam 68. In this regard, the trace suspension assembly 66 is laid upon the load beam 68. The load beam 68 may include a dimple 88 which contacts the gimbal 76 and provides a point of stabilization between the load beam 68 and the gimbal 76. In this embodiment, the shape memory actuators 78, 80 are coupled to the load beam 68. In this regard, deflection of the shape memory actuators 78, 80 moves the load beam 68 and the gimbal 76 for selectively moving the slider 44 towards and away from the disk 20. It is contemplated that the present invention may be practiced with either of the shape memory actuators 78, 80 alone or in combination.

The load beam 68 includes a load beam main section 90 and a load beam distal end 92. The load beam main section is attached to the hinge plate 70. The load beam distal end 92 extends from the load beam main section 90 to adjacent the gimbal 76. Thus the load beam main section 90 supports the gimbal 76 through the load beam distal end 92.

The load beam main section 90 includes the shape memory actuator 78 which is integrated therein. The load beam 68 generally may define a load beam longitudinal axis 94. The shape memory actuator 78 is generally elongate and generally aligned with the load beam longitudinal axis 94. In this embodiment, the shape memory metal material may take the form of a wire, rod or ribbon like shape. Upon application of a dc input, the shape memory metal material of the shape memory actuator 78 is contemplated to expand and/or contract along the load beam longitudinal axis 94. In so doing, the load beam 68 deforms in a bending position as shown for example in FIG. 10.

Figure 10:
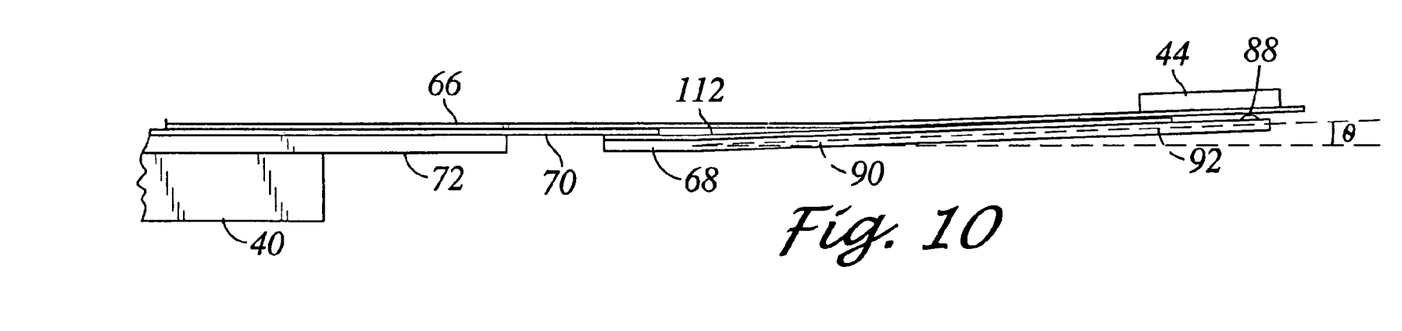
FIG. 10 is an enlarged side view of the suspension assembly of FIG. 2 as shown with the load beam deflected upward.

FIG. 10 depicts the load beam 68 in a bent configuration at the load beam main section 90 with the load beam distal end 92 being bent upward. In this regard, it is contemplated that the attached slider 44 may be moved closer to the disk 20 to thereby change the fly height of the slider 44. In addition, such bent configuration also changes the pitch angle of the slider 44. As shown in FIG. 10, the slider 44 is slightly rotated in a counter clockwise direction. In this regard, it is contemplated that the movement of the slider 44 towards and away from the disk 20 may be effectuated by either translational movement in a direction of the disk 20 or by a change in pitch angle of the slider 44 as at least some portion of the slider is being moved towards or away form the disk 20.

The load beam distal end 92 includes the shape memory actuator 80 which is integrated therein. The load beam distal end 92 may further include a pitch limiter 96. The shape memory actuator 80 is generally elongate and generally aligned with the load beam longitudinal axis 94. In this embodiment, the shape memory metal material may take the form of a wire, rod or ribbon like shape. Upon application of a dc input, the shape memory metal material of the shape memory actuator 80 is contemplated to expand and/or contract along the load beam longitudinal axis 94. In so doing, the load beam 68 deforms in a bending position as shown for example in FIGS. 11-13.

Figure 11:
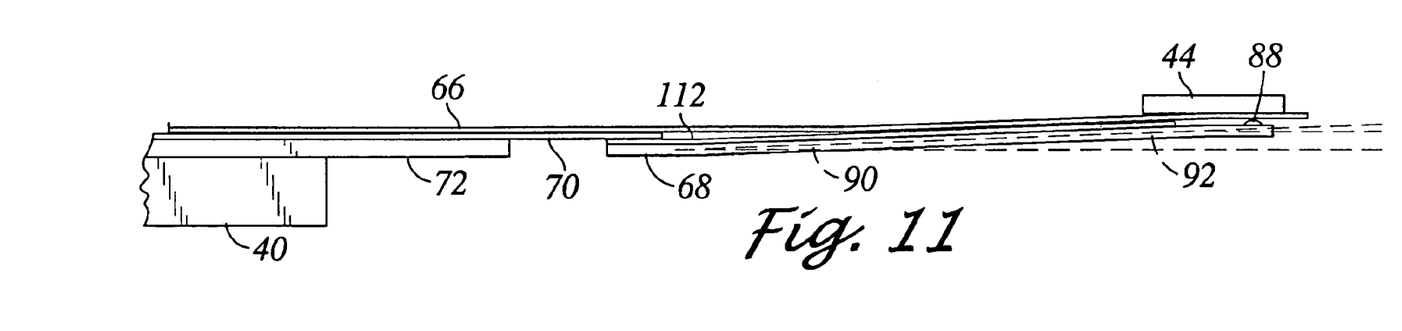
FIG. 11 is the enlarged side view of the suspension assembly of FIG. 10 as shown with a distal portion of the load beam deflected downward and the gimbal deflected upwards.
Figure 12:
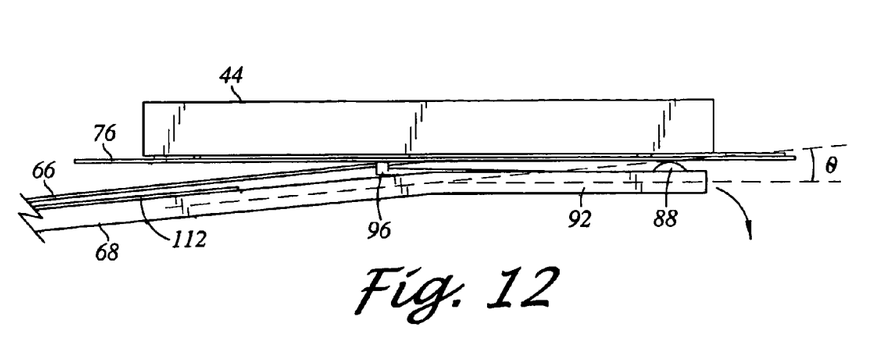
FIG. 12 is a further enlarged view of the suspension assembly of FIG. 11.
Figure 13:
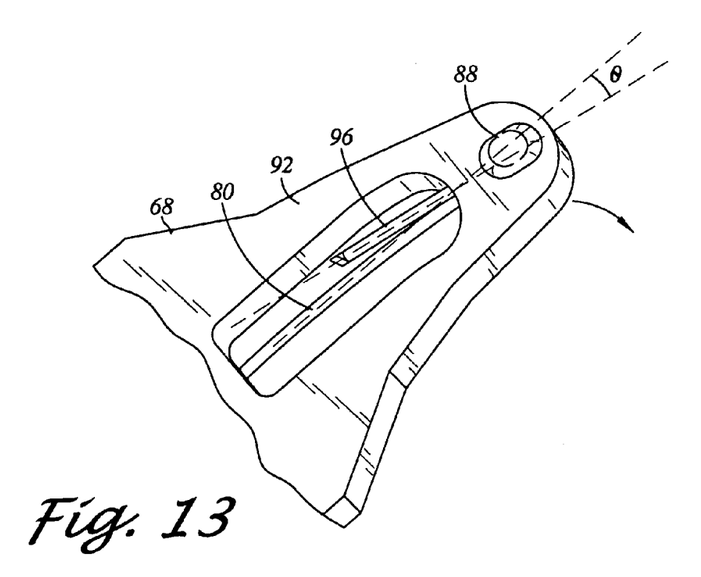
FIG. 13 is a further enlarged perspective view of the load beam of FIG. 11.

With the load beam distal end being in such bent position, the pitch limiter 96 is rotated upward. The pitch limiter 96 is configured to contact the gimbal 76 for rotating the gimbal 76. Thus, the gimbal 76 is cooperatively formed with the load beam distal end 92 to rotate with respect to the load beam main section 90 upon engagement with the load beam distal end 92 for pitch control of the slider 44. In this regard, the pitch limiter 76 may be used to change the pitch angle of the slider 44 to compensate for changes of the pitch angles due to deformation of the load beam main section 90 in order to achieve changes in the fly height independent of the changes in the pitch angle. FIGS. 11-13 depict the load beam 68 in a bent configuration at the load beam distal end 92 being bent downward. In this regard, it is contemplated that the attached slider 44 may be changed in pitch angle of the slider 44. As shown in FIGS. 11-13, the slider 44 is slightly rotated in a clockwise direction.

Figure 14:
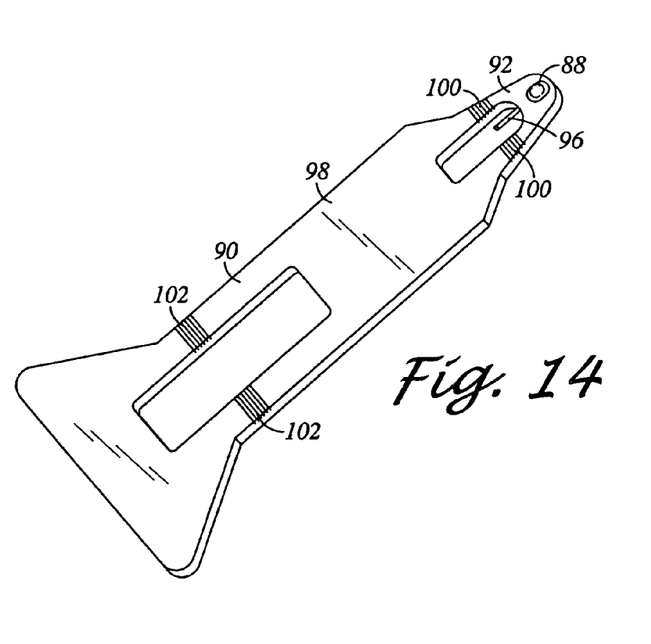
FIG. 14 is an enlarged top perspective view of a load beam according to another aspect of the present invention.
Figure 15:
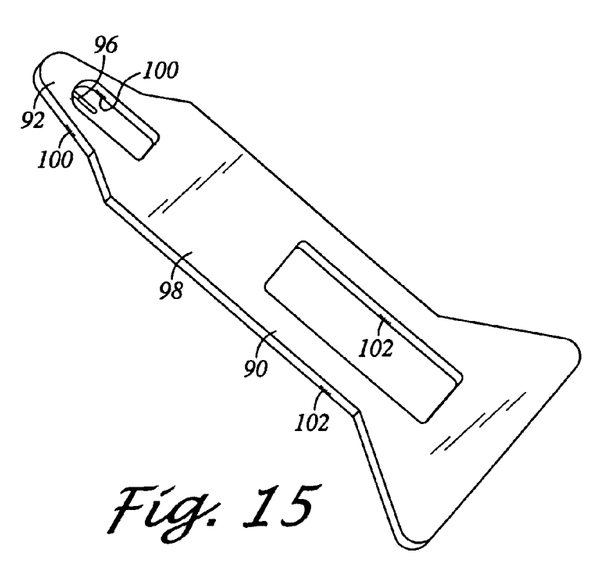
FIG. 15 is an enlarged bottom perspective view of the load beam of FIG. 14.

Referring now to FIGS. 14 and 15, there is depicted a plan view of a load beam 98 according to another embodiment. The load beam 98 is similar in respects to the load beam 76, and similar reference numerals indicate like structures with the differences noted. In this embodiment, the load beam 98 itself is a shape memory actuator. In this regard, the load beam 98 may be formed of a shape memory metal material which is configured to deform in response to a dc input. The load beam 98 may include surface grooving 100, 102 which is selectively disposed about the load beam 98. The surface grooving 100, 102 facilitate local expansion and contraction of the load beam 98 for bending of the load beam 98 at such locations. The particular fabrication techniques of the load beam 98 may also be utilized to influence the degree and location of deformation. For example, localized annealing processes may be used to selectively determine the degree and location of deformation.

Figure 16:
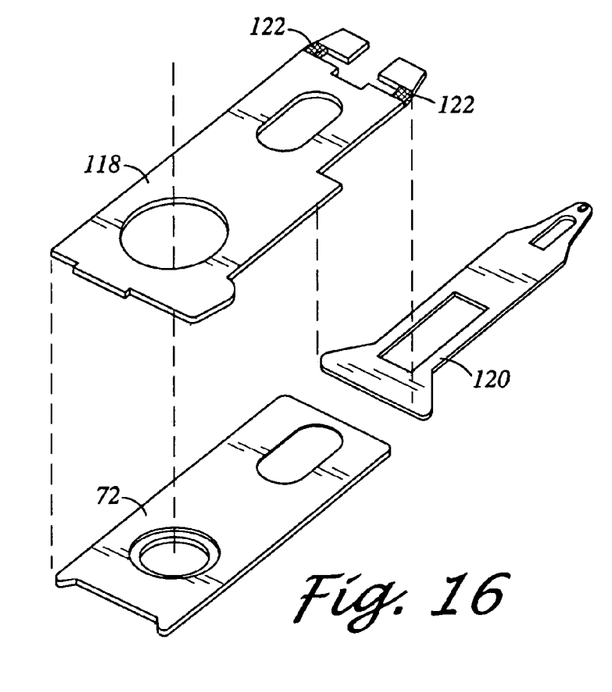
FIG. 16 is an exploded enlarged perspective view of the base plate, and a load beam, and a hinge plate according to another embodiment.
Figure 17:
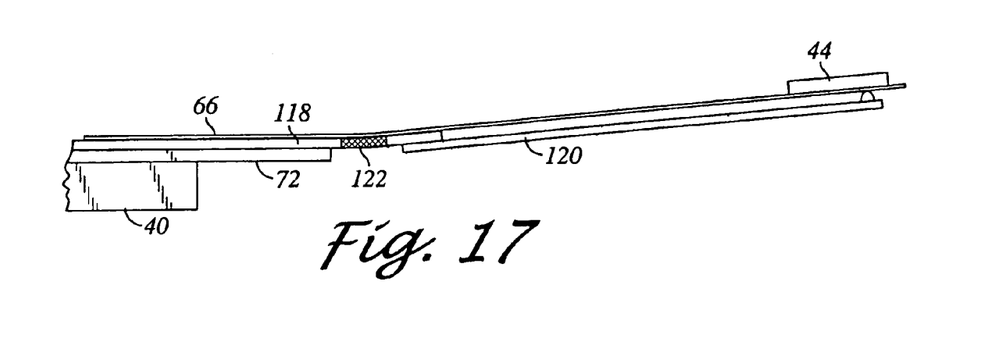
FIG. 17 is a side view of a suspension assembly including the hinge plate and load beam of FIG. 16.

Referring now to FIGS. 16 and 17, there is depicted a view similar to the view of FIGS. 4 and 5, however with a hinge plate 118 and a load beam 120 according to another embodiment of the present invention. In this embodiment the load beam 120 is not required to include any shape memory actuators, and may be formed of stainless steel for example. Rather, in this embodiment, the hinge plate 118 includes a pair of shape memory actuators 122. The shape memory actuators 122 are integrated with the hinge plate 118. Deflection of the shape memory actuators 122 moves the hinge plate 118, the load beam 120, and the gimbal 76 for selectively moving the slider 44 towards and away from the disk 20. The trace suspension assembly 66 is contemplated to electrically connect with the shape memory actuators 122 to provide a dc input. The shape memory actuators 122 deform in response to such dc input. The hinge plate 118 may take on a bent configuration for moving the attached load beam 120. In so doing, the load beam 120 moves the adjacent gimbal 76 and the attached slider 44 towards and away from the disk 20.

In yet another embodiment of the present invention, the gimbal 76 itself may be a shape memory actuator. In this regard, the shape memory actuator may be integrated with the gimbal 76. In such an embodiment, the gimbal 76 may be configured to deform in response to a dc input. The particular fabrication techniques of the gimbal 76 may also be utilized to influence the degree and location of deformation. For example, localized annealing processes may be used to selectively determine the degree and location of deformation. Though not depicted, it is contemplated that electrical traces may be selectively attached to desired locations about the gimbal 76 for providing the dc input.

According to yet another aspect of the present invention, there is provided the head stack assembly 34 for use with the disk drive 10 having a disk, such as disk 20. The head stack assembly 34 includes, the actuator arm 40, the gimbal 76 coupled to the actuator arm 40, the slider 44 as supported by the gimbal 76, and a shape memory actuator, such as the shape memory actuator 78 or 80, is coupled to the gimbal 76. Any one of the shape memory actuators 78, 80 or those of the other embodiments as described may be appropriately utilized. According to yet another aspect of the present invention, there is provided the disk drive 10 including the disk drive base 16, the disk 20 rotatably coupled to the disk drive base 16, and the head stack assembly 34 rotatably coupled to the disk drive base 16. The head stack assembly 34 is as described above.

I claim:

1. A suspension assembly for use with a disk drive having a disk and a slider, the suspension assembly comprising:
   a gimbal including a gimbal tongue surface for bonding to the slider;
   a load beam defining a load beam longitudinal axis, the gimbal being coupled to the load beam; and
   a shape memory actuator coupled to the gimbal, the shape memory actuator being formed of a shape memory metal material, the shape memory actuator overlying the gimbal tongue surface in a direction orthogonal to the load beam longitudinal axis, and the shape memory actuator being elongate and generally aligned with the load beam longitudinal axis.

2. The suspension assembly of claim 1 wherein the shape memory actuator is coupled to the load beam, deflection of the shape memory actuator moves the load beam and the gimbal for selectively moving the slider towards and away from the disk.

3. The suspension assembly of claim 1 wherein the shape memory actuator is integrated with the load beam.

4. The suspension assembly of claim 1 wherein the shape memory actuator is a wire.

5. The suspension assembly of claim 1 wherein the load beam includes a load beam main section and a load beam distal end, the gimbal is supported by the load beam main section, the shape memory actuator is coupled to the load beam distal end, the load beam distal end is formed to engage the gimbal upon actuation of the shape memory actuator, the gimbal is cooperatively formed with the load beam distal end to rotate with respect to the load beam main section upon engagement with the load beam distal end for pitch control of the slider.

6. The suspension assembly of claim 1 wherein the shape memory actuator is integrated with the gimbal.

7. The suspension assembly of claim 1 wherein the shape memory metal material is formed of a NiTiNol material.

8. The suspension assembly of claim 1 wherein the shape memory metal material is formed of a CuZnAl material.

9. The suspension assembly of claim 1 wherein the shape memory metal material is formed of a CuAlNi material.

10. A head stack assembly for use with a disk drive having a disk, the head stack assembly comprising:
an actuator arm;
a gimbal coupled to the actuator arm;
a load beam defining a load beam longitudinal axis, the gimbal being coupled to the load beam;
a slider supported by the gimbal; and
a shape memory actuator coupled to the gimbal, the shape memory actuator being formed of a shape memory metal material, the shape memory actuator overlying the gimbal tongue surface and the slider in a direction orthogonal to the load beam longitudinal axis, and the shape memory actuator being elongate and generally aligned with the load beam longitudinal axis.

11. The head stack assembly of claim 10 wherein the shape memory actuator is coupled to the load beam, deflection of the shape memory actuator moves the load beam and the gimbal for selectively moving the slider towards and away from the disk.

12. The head stack assembly of claim 10 wherein the shape memory actuator is integrated with the load beam.

13. The head stack assembly of claim 10 wherein the shape memory actuator is a wire.

14. The head stack assembly of claim 10 wherein the load beam includes a load beam main section and a load beam distal end, the gimbal is supported by the load beam main section, the shape memory actuator is coupled to the load beam distal end, the load beam distal end is formed to engage the gimbal upon actuation of the shape memory actuator, the gimbal is cooperatively formed with the load beam distal end to rotate with respect to the load beam main section upon engagement with the load beam distal end for pitch control of the slider.

15. The head stack assembly of claim 10 wherein the shape memory actuator is integrated with the gimbal.

16. A disk drive comprising:
a disk drive base;
a disk rotatably coupled to the disk drive base;
a head stack assembly rotatably coupled to the disk drive base, the head stack assembly including;
an actuator arm;
a gimbal coupled to the actuator arm;
a load beam defining a load beam longitudinal axis, the gimbal being coupled to the load beam;
a slider supported by the gimbal and disposed adjacent the disk; and
a shape memory actuator coupled to the gimbal, the shape memory actuator being formed of a shape memory metal material, the shape memory actuator overlying the gimbal tongue surface and the slider in a direction orthogonal to the load beam longitudinal axis, and the shape memory actuator being elongate and generally aligned with the load beam longitudinal axis.

17. The disk drive of claim 16 wherein the shape memory actuator is coupled to the load beam, deflection of the shape memory actuator moves the load beam and the gimbal for selectively moving the slider towards and away from the disk.

18. The disk drive of claim 16 wherein the shape memory actuator is integrated with the load beam.

19. The disk drive of claim 16 wherein the shape memory actuator is a wire.

20. The disk drive of claim 16 wherein the load beam includes a load beam main section and a load beam distal end, the gimbal is supported by the load beam main section, the shape memory actuator is coupled to the load beam distal end, the load beam distal end is formed to engage the gimbal upon actuation of the shape memory actuator, the gimbal is cooperatively formed with the load beam distal end to rotate with respect to the load beam main section upon engagement with the load beam distal end for pitch control of the slider.

21. The disk drive of claim 16 wherein the shape memory actuator is integrated with the gimbal.

* * * * *